June 28, 1932.  A. H. SQUIER  1,864,869
ANTISKID DEVICE
Filed April 30, 1930  2 Sheets-Sheet 1

Inventor
Arthur H. Squier
By Mason Fenwick & Lawrence
Attorneys

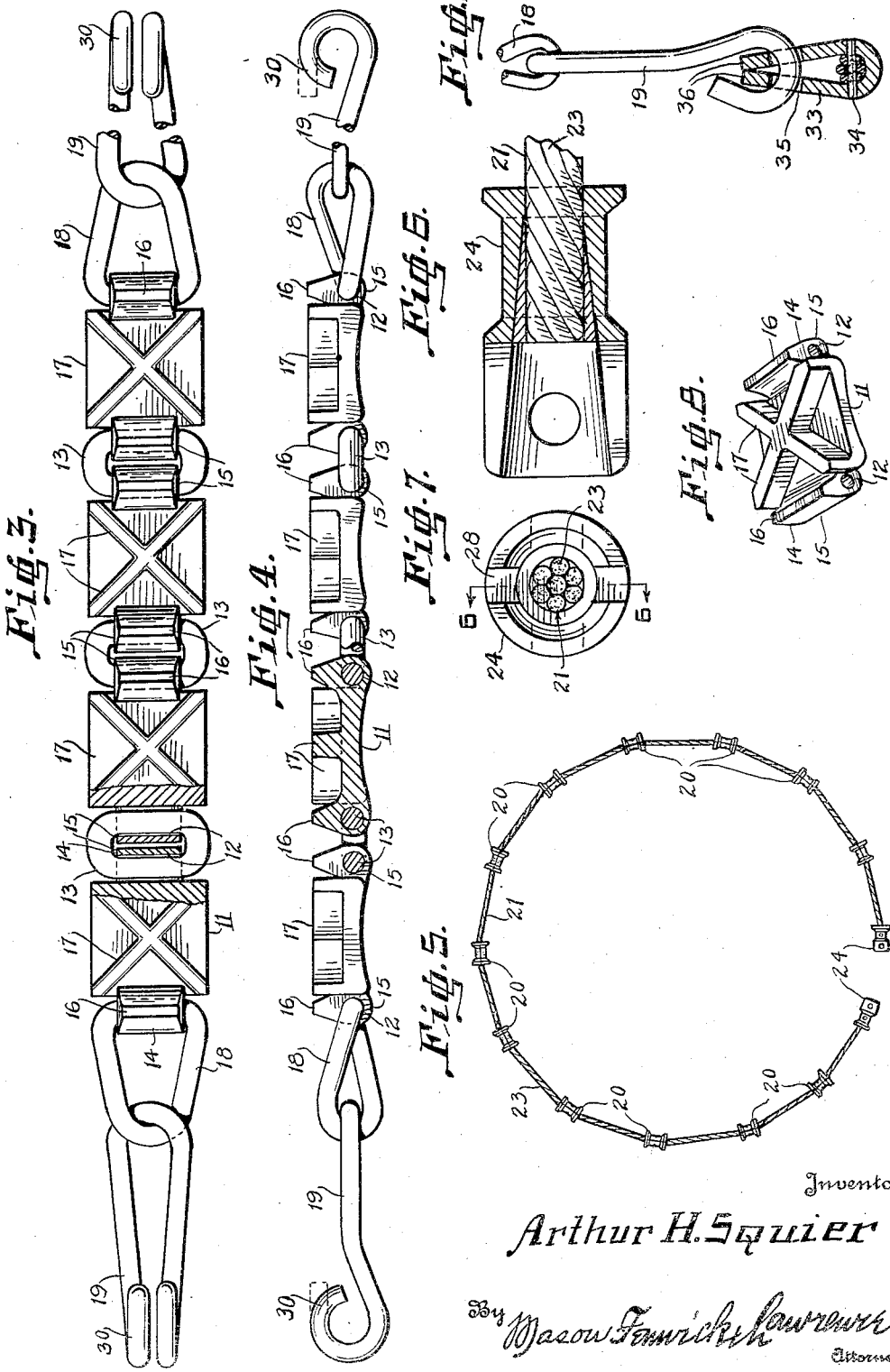

Patented June 28, 1932

1,864,869

UNITED STATES PATENT OFFICE

ARTHUR HYNSON SQUIER, OF RENO, PENNSYLVANIA

ANTISKID DEVICE

Application filed April 30, 1930. Serial No. 448,720.

This invention relates to an improvement in anti-skid devices; and more particularly, to skid chains adapted to be used with vehicle wheels.

The prime object is to provide a structure that will obviate the inherent weakness in chains as now constructed, namely, the breaking of the cross link. In the chain that is now in use, the connection between the links and the cross chains are exposed to wear, and as soon as these connecting links become slightly worn, they are weakened and break, thus ending the life of the chain.

In my chain, I place the connecting links immediately adjacent the surface of the tire and place a protecting spike above the same so that the spike will have to wear down below the surface of the chain before the connecting link is exposed to wearing contact.

Another object is to make the cross chain semi-rigid so as to have all the advantages of a flexible cross chain and yet overcome the disadvantages of a too flexible cross chain. It is well known that under certain conditions a flexible cross chain will cease to function and simply act as skids or runners for the car, whereas to have the cross chain too rigid is injurious to the tire and does not give the greatest efficiency under all conditions.

Still another object is to include a side cable having spacing means fixed thereto which are in the form of ferrules or spools so that the cross link chains are held securely in place and spaced from one another, thus having the cross chains contact with the spools instead of the side cable which prevents the same from breaking or being worn out. The rounded surface of the spools permits sufficient play to prevent any friction taking place.

Another object is to make the spike plates forming the cross chain with a slightly concave under surface so that the same will fit the contour of the tire.

Still another object is to make the spike plates of thin metal so as to save the same and utilize the anti-skid projections to form reinforcing elements for the plates.

Other objects will be disclosed in the specification and drawings forming a part of this application.

In the drawings:

Figure 3 is a top plan of the cross chain in extended position;

Figure 4 is a side elevation of the cross chain shown in Figure 3 partly in section;

Figure 5 is a detail of the side cable removed from the tire;

Figure 6 is a vertical section taken on line 6—6 of Figure 7;

Figure 7 is an end elevation of the device shown in Figure 6;

Figure 8 is a detail perspective of one of the spike plates; and

Figure 9 is a modified form of a means for connecting the said cable to the cross chains;

Referring to the drawings in which similar parts are designated by like numerals:

Figure 1:
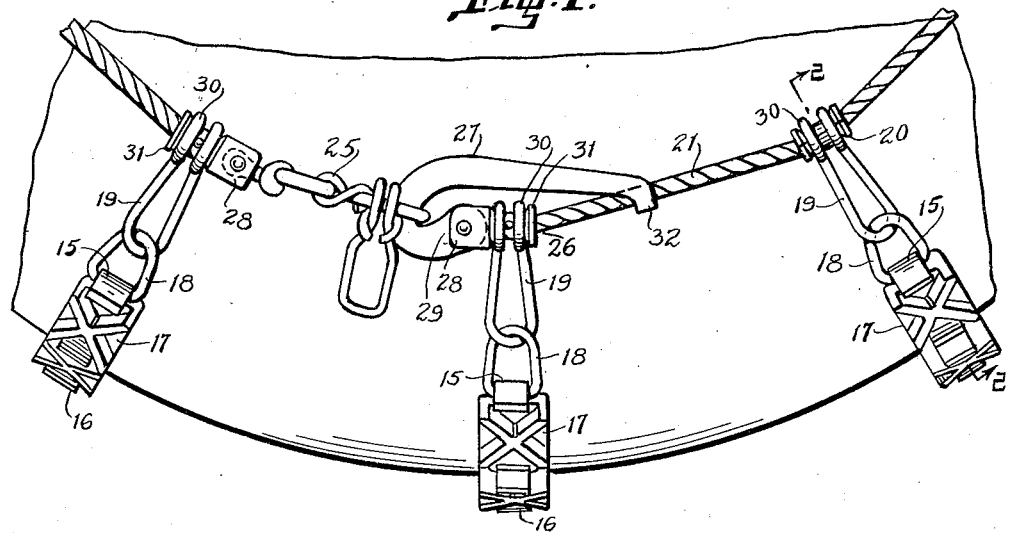
Figure 1 is a fragmentary side elevation showing the skid chain in relation to a tire.
Figure 2:
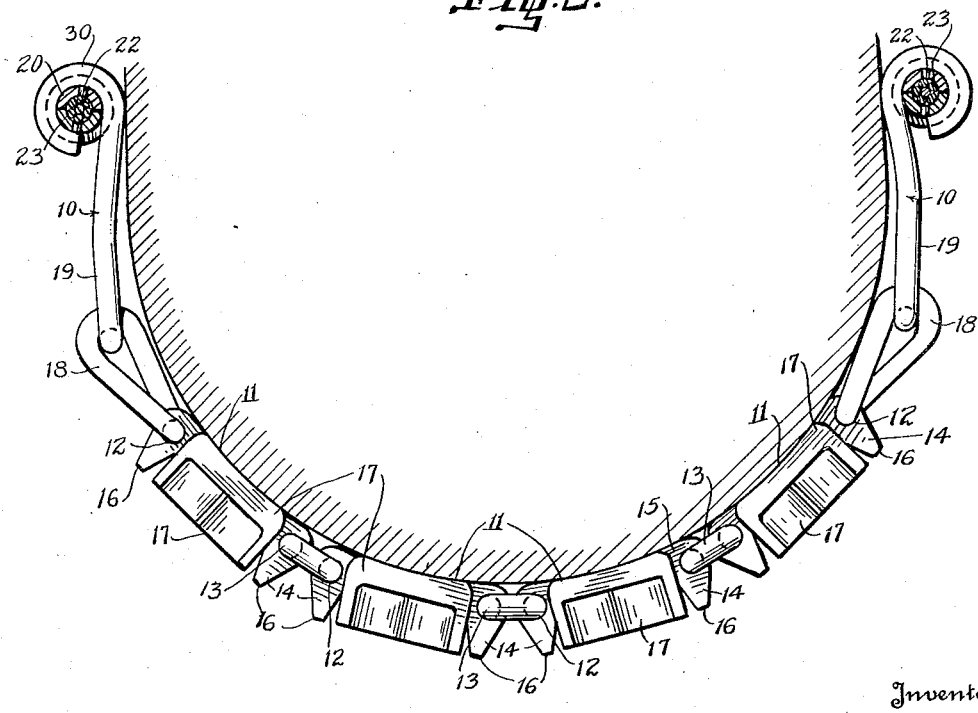
Figure 2 is a section taken on line 2—2 of Figure 1.

Numeral 10 designates a cross chain having concave plates 11 with openings 12 at the ends thereof to receive connecting links 13. In reality the end portions of the plates 11 are spikes or shoulders 14, with thick body portions 15 where the openings 12 are formed and tapering to an edge at the top portions 16. The body portions 15 of each plate 12 contact with the adjacent body portions of the adjacent plate, so that the connecting links 13 are completely protected, as more clearly shown in Figure 3.

Cross members 17 in the form of an X extend diagonally from corner to corner of the plates 12 and in addition to performing the anti-skid function serve to brace the plates 12 which permits the use of less metal in the plates 12. The spikes 14 and cross members 17 are of the same height and are made integral with their respective plates 12. From the last plate 12 on each end of the cross chains, extend links 18 which in turn have hook members 19 extending therefrom.

These hooks 19 are adapted to engage ferrules or spools 20 fixedly connected and spaced on a side cable 21 by rivets, or other suitable means, 22. The side cable 21 is preferably formed of strands of wire 23, thereby having the ferrules or spools 20 secured to the side cable 21. The cross chains 10 are properly spaced and the surface of the cable 21 is protected since the friction will be taken up by the ferrules or spools 20.

The ends 24 of the side cable 21 have on one end a plurality of links 25 and on the other ends 26 curved levers 27 are pivotally mounted in slots 28, formed in projections 29 which extend from the end ferrules 30 formed integral therewith, as more particularly shown in Figures 6 and 7. On the other side 31 of ferrule 30, the cable 21 is secured in the ferrule 30 by reason of the babbited interior of the ferrule 30.

The curved levers 27 have curved ends 32 which are held in closed position by being passed under the cable 21.

As shown in the modified form in Figure 9, a clamp 33 formed from a blank and folded upon itself and secured to the cable 21 by a rivet 34 is used in place of the ferrules 20. An opening 35 is formed in the upturned ends 36 wide enough to receive one of the hook members 19. The interior of the opening 35 is slightly beveled to more readily permit movement of the hook member 19 in the opening when such movement is necessary.

From this description it is apparent that I have produced a skid chain that is designed to overcome the weaknesses of the present skid chains and at the same time is economical to manufacture. The principal cause of the breaking of the present day skid chains, namely, the wearing of the connecting link, has been obviated, making it necessary in my chain for the entire anti-skid projection to be worn down to the same level as the connecting link. The links themselves are so constructed and designed as to give the utmost strength while utilizing the least material.

By making the plates 11 concave, the same rest snugly against the surface of the tire to give maximum efficiency, both as to traction and anti-skidding. The spaced ferrules on the side cable serve to space the cross chains and save the side cable from wear. Extra links in the ends of the side cables permit the ready adjustment of the tire chains to varying sizes of wheels and also permit better adjustment.

It is obvious that the gist of my invention does not reside necessarily in the particular form of projection shown herein, as projections of any design may be utilized so long as they extend sufficiently above the plates 11 and are substantially in the same position.

What I claim is:

1. In an anti-skid device for tires and the like, side cables adapted to extend around the side walls of a tire, spacing members fixedly secured on said cables, a spacing member at one end of said cables and having a bifurcated portion extending therefrom, fastening means mounted in said bifurcated portion adapted to secure the opposite ends of said cable, cross chains adapted to extend across the periphery of a tire and secured to said spacing members.

2. In an anti-skid device for tires and the like, side cables adapted to extend around the side walls of a tire, ferrules fixedly secured on said cables, a ferrule at one end of said cables and having a bifurcated portion extending therefrom, a curved lever mounted in said bifurcated portion adapted to secure the opposite ends of said cable, cross chains adapted to extend across the periphery of a tire and secured to said ferrules.

3. In an anti-skid device for tires and the like, side cables adapted to extend around the side walls of a tire, ferrules spaced apart on and fixed to said cables, each cable having a bifurcated ferrule at one of its ends and having a link connected to its other end, a lever pivotally mounted in each bifurcated ferrule and co-operating with the link on the other end of the cable to secure the opposite ends of the cable, and cross chains adapted to extend across the periphery of the tire and secured to said ferrules.

In testimony whereof I affix my signature.

ARTHUR HYNSON SQUIER.